US008504204B2

(12) United States Patent
Owens, Jr.

(10) Patent No.: US 8,504,204 B2
(45) Date of Patent: Aug. 6, 2013

(54) AUTOMATED POSITIONING OF AN ORGANIC POLARIZED OBJECT

(75) Inventor: Kenneth Dewane Owens, Jr., Eureka, CA (US)

(73) Assignee: Cognisense Labs, Inc., Eureka, CA (US)

( * ) Notice: Subject to any disclaimer, the term of this patent is extended or adjusted under 35 U.S.C. 154(b) by 71 days.

(21) Appl. No.: 12/841,191

(22) Filed: Jul. 22, 2010

(65) Prior Publication Data

US 2012/0022691 A1  Jan. 26, 2012

(51) Int. Cl.
*A01C 7/04* (2006.01)
*A01G 9/08* (2006.01)

(52) U.S. Cl.
USPC .................................... 700/259; 47/1.01 P

(58) Field of Classification Search
USPC ............................. 700/259; 47/1.01 P
See application file for complete search history.

(56) References Cited

U.S. PATENT DOCUMENTS

| 4,437,114 | A | * | 3/1984 | LaRussa | 348/94 |
| 4,707,647 | A | * | 11/1987 | Coldren et al. | 382/151 |
| 4,909,376 | A | * | 3/1990 | Herndon et al. | 198/395 |
| 5,247,761 | A | * | 9/1993 | Miles et al. | 47/1.01 R |
| 5,320,649 | A | * | 6/1994 | Holland | 47/1.01 R |
| 7,433,059 | B2 | * | 10/2008 | van der Knijff et al. | 356/614 |
| 2005/0114918 | A1 | * | 5/2005 | Hirahara et al. | 800/278 |

FOREIGN PATENT DOCUMENTS

| EP | 981950 A1 | * | 3/2000 |
| EP | 1817959 A1 | * | 8/2007 |
| JP | 60-167690 U | * | 11/1985 |
| JP | 03043182 A | * | 2/1991 |
| JP | 09038883 A | * | 2/1997 |
| JP | 09123080 A | * | 5/1997 |
| JP | 10028418 A | * | 2/1998 |
| JP | 11318222 A | * | 11/1999 |
| JP | 2000023508 A | * | 1/2000 |
| JP | 2007118148 A | * | 5/2007 |
| JP | 2009255191 A | * | 11/2009 |
| NL | 1018273 | * | 12/2002 |
| NL | 1018848 | * | 3/2003 |
| WO | WO 9319581 A1 | * | 10/1993 |
| WO | WO 03022034 A1 | * | 3/2003 |

OTHER PUBLICATIONS

JPO machine translation of JP 2000-23508.*
Machine translation of NL 1018848 C1.*
Machine translation of NL 1018273 C2.*
JPO machine translation of JP 09-38883.*
Translation of JP 60-167690 U.*

* cited by examiner

*Primary Examiner* — James Trammell
*Assistant Examiner* — David Testardi
(74) *Attorney, Agent, or Firm* — Raj Abhyanker, P.C.

(57) ABSTRACT

A method, system and apparatus to position an organic polarized object to a predetermined orientation and a predetermined location are provided. In an embodiment, an image of the organic polarized object is captured through an image capture device. The image of the organic polarized object is converted to an image data set. This image data set if further converted to a dimension data set. A first location and a first orientation of the organic polarized object are determined through a processor. A pressure is applied to secure organic polarized object. The organic polarized object is secured through a robotic end effector and may be moved to a predetermined location and a predetermined orientation. The organic polarized object is adjusted to the predetermined orientation. The organic polarized object is positioned at a predetermined location. The predetermined location and predetermined orientation may be selected by a user.

7 Claims, 12 Drawing Sheets

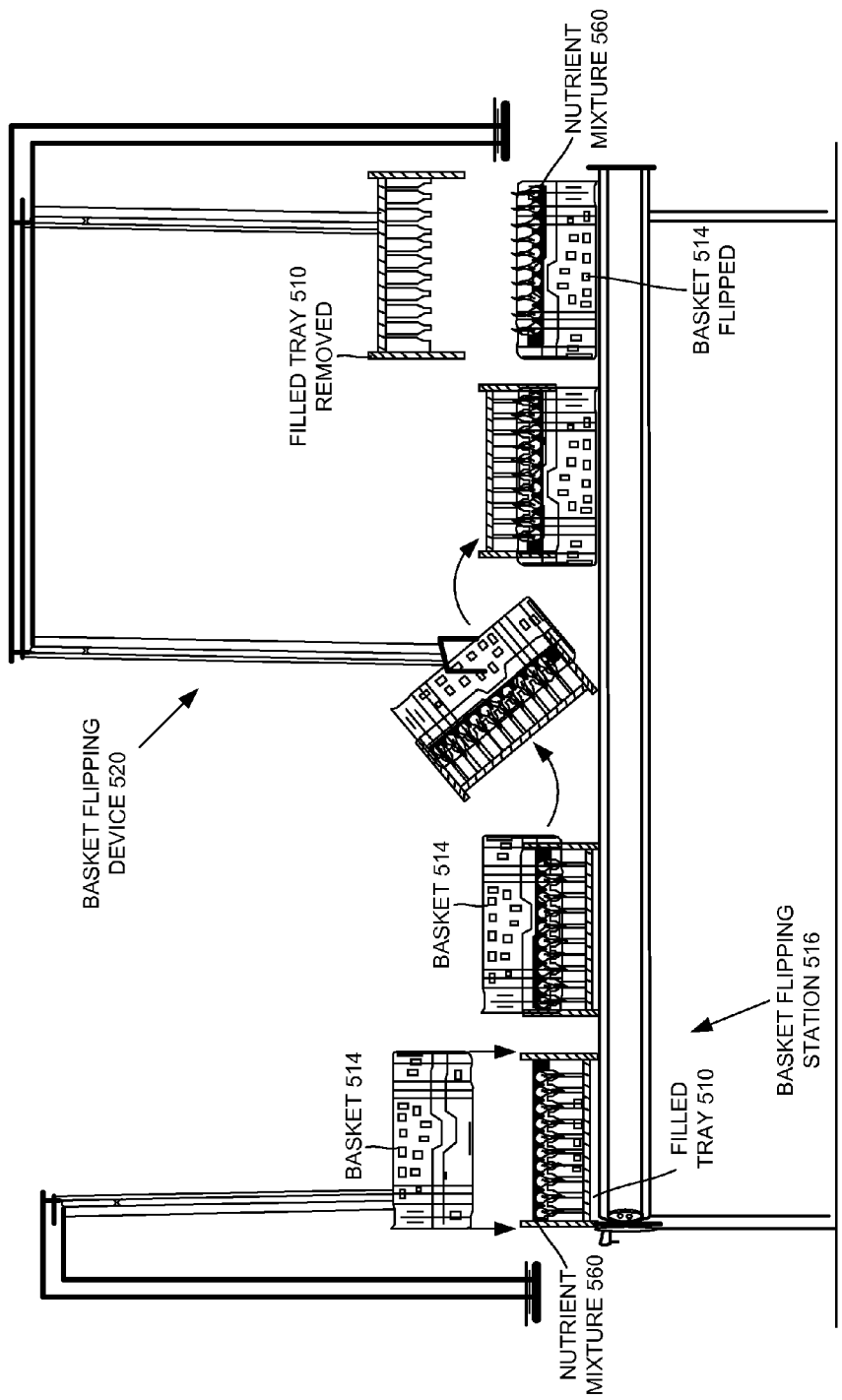

AUTOMATED POSITIONING OF AN ORGANIC POLARIZED OBJECT

FIELD OF TECHNOLOGY

This disclosure relates generally to robotic technology and, more particularly, to automated positioning of an organic polarized object at a predetermined location with a predetermined orientation, through a robotic end effector.

BACKGROUND

A robotic arm may be an electromechanical device that may have an extendable frame that can manipulate, rotate, and/or physically move an object. The robotic arm may be programmable and may have similar functions to that of a human arm. The links of such a robotic arm may be connected by joints that may allow rotational motion (such as in an articulated robot) and/or translational (linear) displacement. The links of the manipulator may be considered to form a kinematic chain. One end of the kinematic chain of the robot arm may be called an end effector. The end effector (or robotic end effector) may be analogous to the human hand. The end effector may be designed to perform any desired task such as welding, gripping, spinning etc., depending on an application. For example, the robotic arm may be used in automotive assembly lines to perform a variety of tasks such as welding, a part rotating, and/or positioning objects during assembly.

The robotic arm may be designed to perform repetitive tasks on uniform objects. The robotic arm may damage certain objects, because it may grip too tightly. Organic polarized objects that may be delicate may be manually positioned so as to prevent damaging the organic polarized objects, for example, plant bulbs may be manually planted. Manually positioning organic polarize objects has several disadvantages including being inefficient and/or dependant on manual labor.

SUMMARY

A method, a system and an apparatus disclosed herein address a need for automated securing and/or positioning of an organic polarized object in a predetermined orientation at a predetermined location.

In one aspect, the method includes capturing an image of an organic polarized object through an image capture device. The method also includes, through the use of a processor, converting the captured image of the organic polarized object to an image data of the organic polarized object. The method further includes determining, through a processor, a first location, a first size and/or a first orientation of the organic polarized object based on the image data of the organic polarized object. The method furthermore includes guiding through the processor, a movement of a robotic arm towards the organic polarized object, along one or more of x, y, and z coordinate axes. The method furthermore includes applying a pressure to secure the organic polarized object at the first location with the first orientation.

The method furthermore includes securing, through a robotic arm the organic polarized object to move the organic polarized object to a predetermined location. The method furthermore includes adjusting the secured organic polarized object from the first orientation to a predetermined orientation. The method furthermore includes positioning the organic polarized object of the predetermined orientation in a predetermined location. The method furthermore includes automating, through a training data set, the positioning of the organic polarized object of the predetermined orientation at the predetermined location. In some embodiments, the predetermined location and/or the predetermined orientation are selected by a user.

In another aspect, the system includes an image capture device to capture an image of an organic polarized object. The system also includes a processor to determine a first location and/or a first orientation of the organic polarized object. The system further includes a robotic hand to secure the organic polarized object. The system furthermore includes a robotic arm to adjust the first location and/or the first orientation of the organic polarized object to a predetermined location and/or a predetermined orientation.

In yet another aspect, the apparatus includes a robotic arm to adjust a first location and/or a first orientation of an organic polarized object to a predetermined location and/or a predetermined orientation. The apparatus also includes a robotic hand to secure the organic polarized object. The apparatus further includes a first pneumatic cylinder to reduce damage to the organic polarized object by adjusting a pressure applied to the organic polarized object when the organic polarized object is secured through the robotic hand. The apparatus furthermore includes a valve to reduce damage to the organic polarized object by adjusting the pressure of a compressed air of the pneumatic cylinder when the organic polarized object is secured through the robotic hand.

The methods, systems, and apparatuses disclosed herein may be implemented in any means for achieving various embodiments, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIGS. 5A-5B illustrate an automated organic polarized object organization in one or more slots of a tray for an industrial application, using a robotic arm, according to one or more embodiments.

Other features of the present embodiments will be apparent from accompanying Drawings and from the Detailed Description that follow.

DETAILED DESCRIPTION

A system, an apparatus, and a method of positioning an organic polarized object to a predetermined location with a predetermined orientation by vertically inverting the organic polarized object are disclosed. In the following description, for the purposes of explanation, numerous specific details are set forth in order to provide a thorough understanding of the various embodiments. It may be evident, however, to one skilled in the art that the various embodiments may be practiced without these specific details.

Figure 1A:
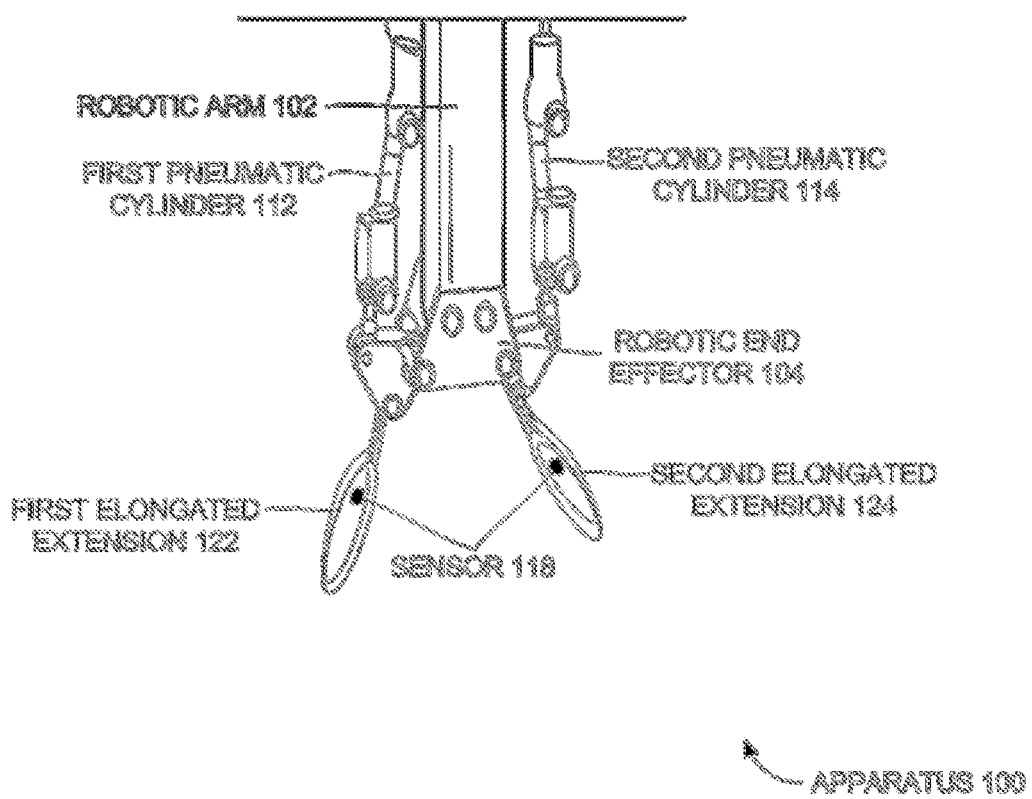
FIG. 1A illustrates a top view of an apparatus for positioning an organic polarized object at a predetermined location with a predetermined orientation, according to one or more embodiments.
Figure 1B:
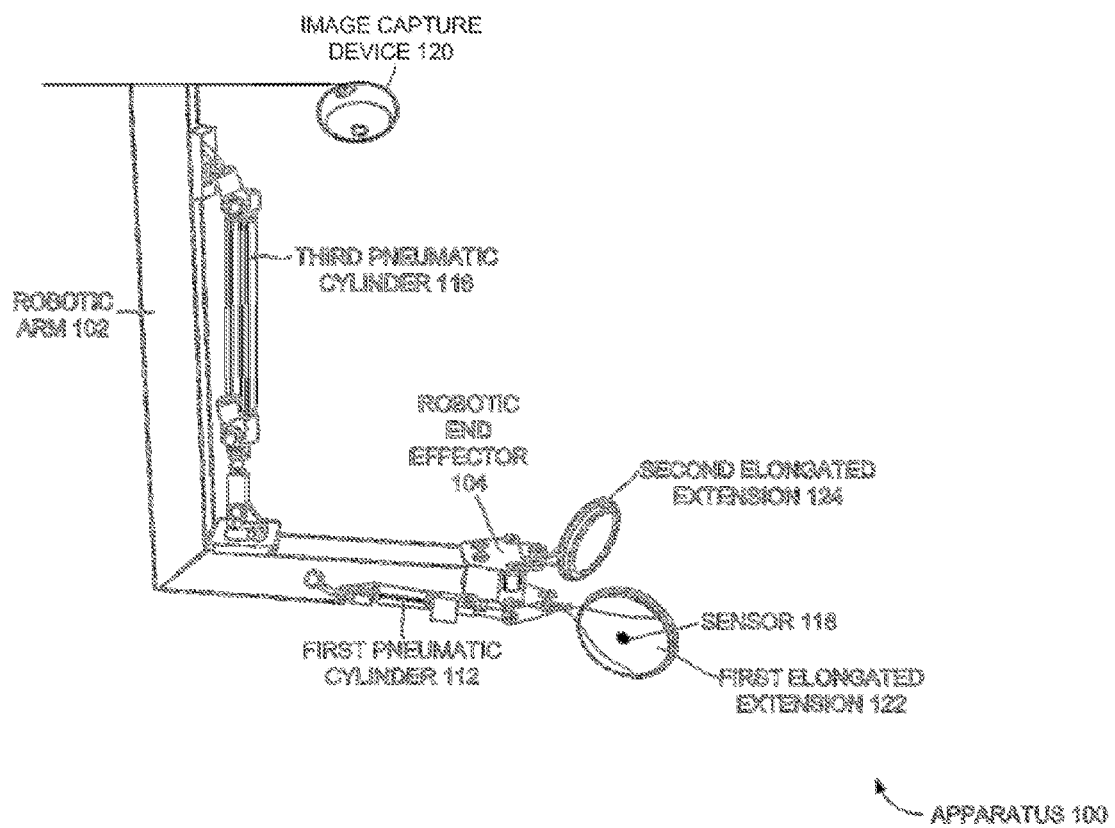
FIG. 1B illustrates a right side view of an apparatus for positioning an organic polarized object at a predetermined location with a predetermined orientation, according to one or more embodiments.

FIG. 1A illustrates a top view of an apparatus 100 for positioning an organic polarized object at a predetermined location and/or in a predetermined orientation, in accordance with one or more embodiments. For purposes of illustration, the detailed description refers to an organic polarized object; however the scope of the method, the system, and the apparatus disclosed herein is not limited to a single organic polarized object but may be extended to include an almost unlimited number of organic polarized objects. As used herein, the term "organic polarized object" may refer to an organic object with polarity, having a proximal end and a distal end, and hence an orientation. Examples of the organic polarized object include, but are not limited to, a seed, a plant bulb, a resting stage of a seed plant, and/or a sapling. FIG. 1B illustrates a right side view of the apparatus 100 for positioning an organic polarized object at the predetermined location with the predetermined orientation, in accordance with one or more embodiments. The apparatus 100 may include a robotic arm 102, one or more pneumatic cylinders, for example, a first pneumatic cylinder 112, a second pneumatic cylinder 114, and a third pneumatic cylinder 116, an image capture device 120, one or more elongated extensions (e.g. a first elongated extension 122, a second elongated extension 124), and a valve (not shown). The robotic arm 102 may be trained to capture an image of an organic polarized object through the image capture device 120 to determine a shape, a size, a first location and/or a first orientation of the organic polarized object based on the image. In one or more embodiments, one or more feature extraction techniques including, but not limited to a generalized Hough transform may be used to determine the first orientation, size, shape, and/or the first location of the organic polarized object based on the image data. In one or more embodiments the robotic end effector 104 may include a sensor 118 to sense various parameters associated with the organic polarized object, the parameters including one or more dimensions, a stress withstanding capacity, and one or more contours on a surface of the organic polarized object. Examples of the sensor include, but are not limited to an infra-red device, a biosensor, a color sensor, a heat sensor, and a liquid sensor.

The coordinate system of the robotic arm 102 may be calibrated to match coordinate system of the image capture device 120 through a calibration module. Further the robotic arm 102 may receive commands from a processor to pick up and place an organic polarized object in a predetermined location and orientation by using comparing a training data set with the organic polarized object. Further, the robotic arm 102 may adjust the first location and/or the first orientation of the organic polarized object to a predetermined location and/or a predetermined orientation. In some embodiments, the predetermined location and/or predetermined orientation may be preset in an application. In some other embodiments, the predetermined location and/ or the predetermined orientation are selected by a user. In some embodiments, the robotic arm 102 may include a user interface to receive the predetermined orientation and/or the predetermined location selected by the user. In some embodiments, the robotic arm 102 may be operatively coupled with an interface external to the robotic arm 102 to receive the predetermined orientation and/or the predetermined location selected by the user. The robotic end effector 104 and/or the robotic arm 102 may secure the organic polarized object. The pneumatic cylinders of the robotic arm 102 reduce damage to the organic polarized object by adjusting the grip closure around the organic polarized object when the organic polarized object may be secured through the robotic end effector 104 and/or the robotic arm 102.

The first elongated extension 122 and the second elongated extension 124 may close simultaneously to secure the organic polarized object. In some embodiments, the first elongated extension 122 and/or the second elongated extension 124, includes a cuff that is disc-shaped and/or concave so as to secure the organic polarized object that is curved in shape and delicate in nature. In some embodiments, the elongated extensions and/or cuff is made of a flexible material to reduce the damage to the organic polarized object. Examples of the flexible material include, but are not limited to rubber and flexible plastic. In some embodiments, the first pneumatic cylinder 112 and the second pneumatic cylinder 114 regulate the movement of the first elongated extension 122 and the second elongated extension 124 respectively. In some embodiments, the third pneumatic cylinder 116 regulates the movement of the robotic end effector 104. For purposes of illustration, the detailed description refers to a first pneumatic cylinder, a second pneumatic cylinder, and a third pneumatic cylinder; however the scope of the method, the system, and the apparatus disclosed herein is not limited to the first pneumatic cylinder, the second pneumatic cylinder, and the third pneumatic cylinder but may be extended to include an almost unlimited number of actuators.

Multiple pneumatic cylinders may be used to regulate the movement of the robotic arm 102 and various components of the robotic arm 102 therein. In some embodiments, damage to the organic polarized object may be reduced through the valve by adjusting the pressure of a compressed air of one or more of the pneumatic cylinders when the organic polarized object may be secured through the robotic end effector 104. In some embodiments, the valve also regulates and/ or synchronizes closing of the first elongated extension 122 and the second elongated extension 124 such that the first elongated extension 122 and the second elongated extension 124 close simultaneously and in a regulated manner. In one or more embodiments, one or more motions of the robotic arm 102 includes "n" degrees of freedom of movement. The "n" degrees of freedom of movement includes, but is not limited to, a moving up and down in heaving, a moving left and right in swaying, a moving forward and backward in surging, a tilting forward and backward in pitching, a turning left and right in yawing, a full axis motion in 360 degree rotation, a tilting side to side in rolling, and a moving along one or more of x, y, and z coordinate axes.

The system disclosed herein may include the image capture device 120 to capture the image of the organic polarized object. Examples of the image capture device 120 may include, but is not limited to, a digital camera/cameras, a video camera, a probe, an optical device, an infra-red device, a biosensor, a color sensor, a heat sensor, a water sensor and a laser device. The captured image of the organic polarized object may be converted into an image data of the organic polarized object. The image data may be later used to determine the first location, first size and/or the first orientation of the organic polarized object. Examples of the image data includes but is not limited to, one or more dimensions of the organic polarized object, a three-dimensional structure of the organic polarized object, mass and density of the organic polarized object and/or a shape of the organic polarized object. The system also includes the robotic arm 102 to adjust the first location and/or the first orientation of the organic polarized object to the predetermined location and/ or the predetermined orientation respectively. In one or more embodiments, the system further includes a processor operatively coupled to the robotic arm 102 to determine the first location and/or the first orientation of the organic polarized object. In one or more embodiments, the processor automates the positioning of the organic polarized object to the predetermined location with a predetermined orientation.

In one or more embodiments, the predetermined location and/or the predetermined orientation are selected by a user. In these embodiments, the system includes a user interface to receive the predetermined location and/or the predetermined orientation from the user. The system furthermore includes a robotic end effector 104 operatively coupled to the robotic arm 102 to secure the organic polarized object without damaging the organic polarized object. The elongated extensions of the robotic end effector 104 may be made of a flexible material to reduce the damage to the organic polarized object. In one or more embodiments, the system furthermore includes the valve configured to reduce damage to the organic polarized object on securing the organic polarized object through the robotic arm 102. In one or more embodiments, the system includes a tray including slots or pins to position one or more organic polarized objects in the slots/pins of the tray through the robotic arm 102. During positioning the organic polarized objects in the tray, a first end of the organic polarized object may be oriented towards a narrow base of the slot/pin and a second end may be oriented towards a broad opening of the slot/pin. The organic polarized objects may be positioned in the slots/pins of the tray to encourage growth of the organic polarized objects in the tray. In one or more embodiments, a hydroponic technology may be used to grow the organic polarized objects. As used herein the term hydroponics refers to a method of growing plants without soil. In these embodiments one or more essential nutrients may be introduced to the organic polarized objects through fluids (e.g., water) in the place of soil. In some embodiments, the system further includes a conveyor belt to transport the organic polarized object from storage of the organic polarized object to the robotic arm 102.

Figure 2A:
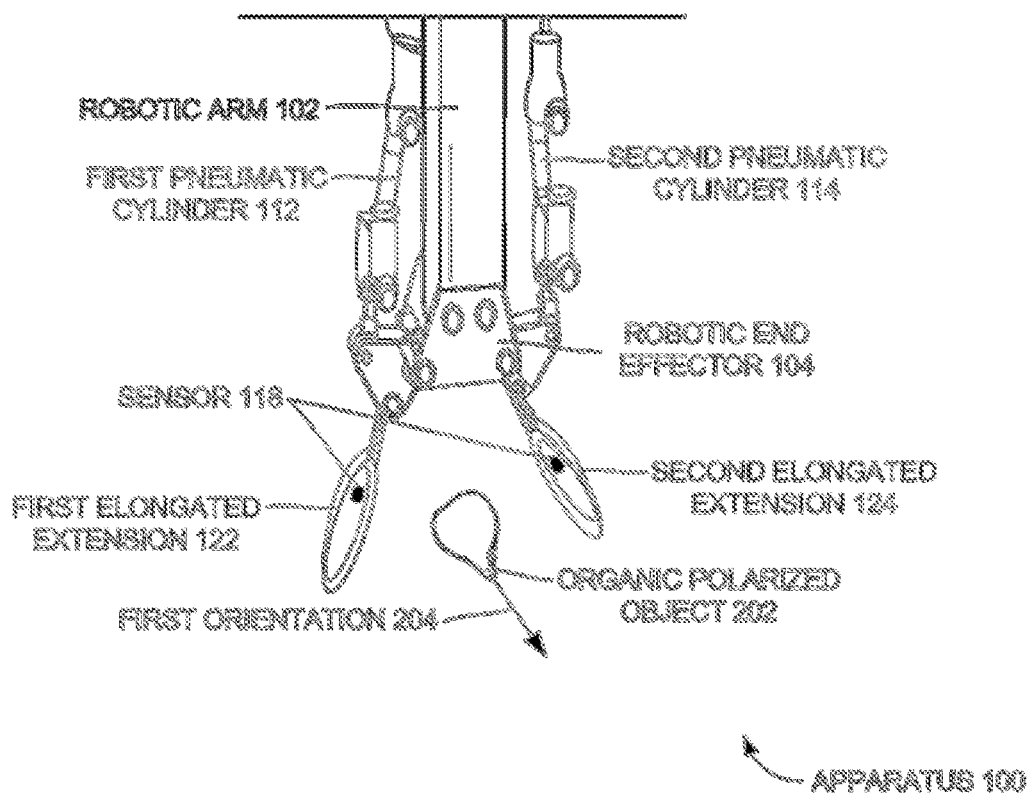
FIGS. 2A-2C illustrate positioning an organic polarized object in a predetermined location at a predetermined orientation, according to one or more embodiments.
Figure 2B:
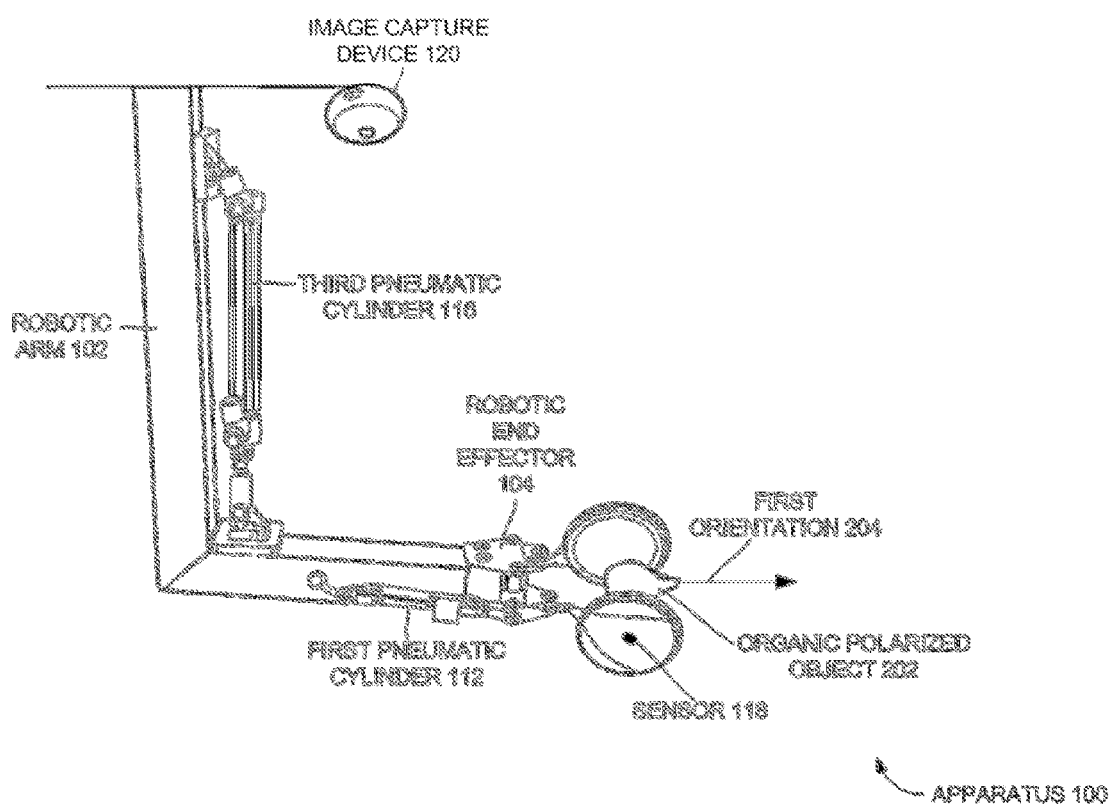
Figure 2C:
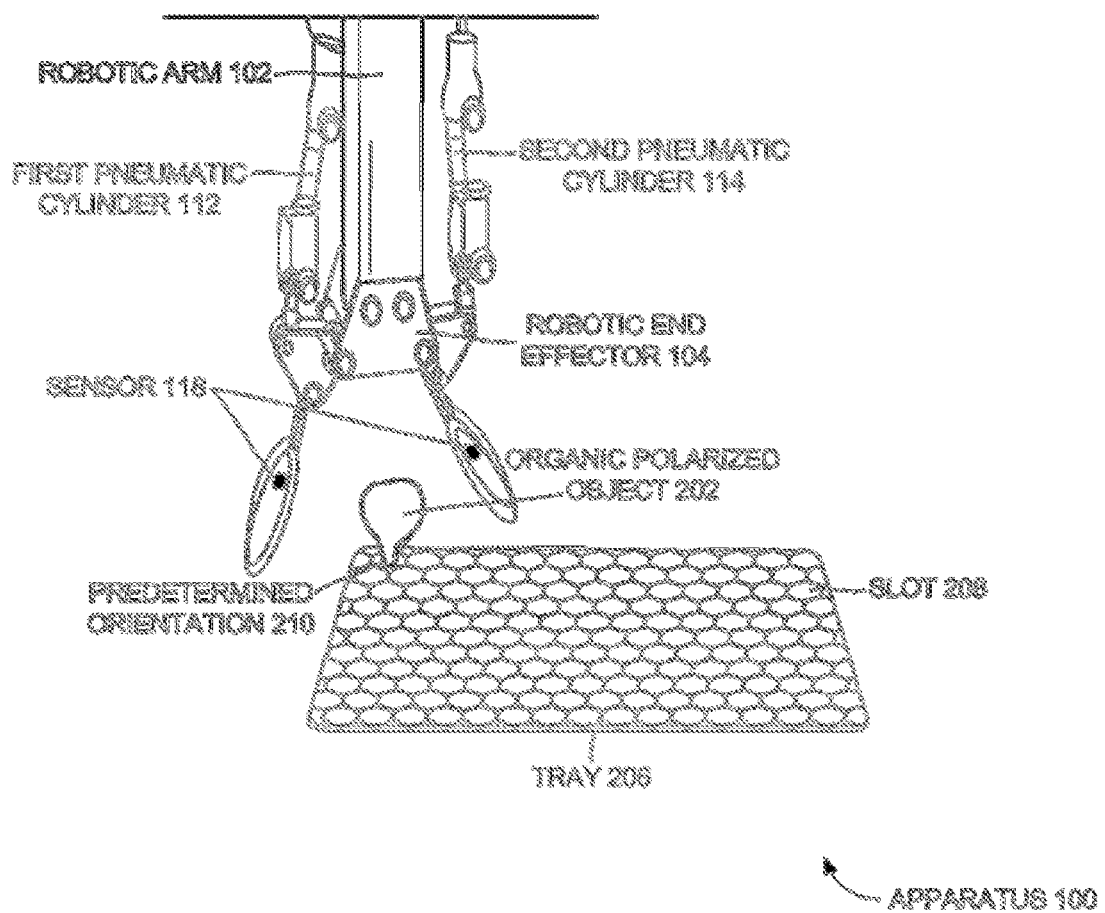

FIGS. 2A-2C illustrate positioning an organic polarized object 202 at a predetermined location with a predetermined orientation 210, in accordance with one or more embodiment. A robotic arm 102 determines a first orientation 204 of the organic polarized object 202. FIG. 2B exemplarily illustrates securing the organic polarized object 202 between the first elongated extension 122 and the second elongated extension 124 of the robotic arm 102. During securing the organic polarized object 202, the robotic arm 102 senses various parameters associated with the organic polarized object 202, the parameters including one or more dimensions, a stress withstanding capacity, and one or more contours on a surface of the organic polarized object 202, using a sensor 118. Examples of the sensor include, but are not limited to an infra-red device, a biosensor, a color sensor, a heat sensor, and a liquid sensor. Based on the sensed parameters, the robotic arm 102 may compute a required pressure to secure the organic polarized object 202 without causing damage or deformation to the organic polarized object 202. In one or more embodiments the robotic arm 102 determines the various parameters associated with the organic polarized objects through the image capture device 120. The image capture device 120 includes, but is not limited to, a digital camera, a video camera, a probe, an optical device, an infra-red device, a biosensor, a color sensor, a heat sensor, a water sensor, and a laser device.

The robotic arm 102 then secures the organic polarized object 202 by exerting the required pressure through the first elongated extension 122 and the second elongated extension 124. Also, a first pneumatic cylinder 112 regulates the movement of the first elongated extension 122 and a second pneumatic cylinder 114 regulates the movement of the second elongated extension 124 during securing the organic polarized object 202. Further, a third pneumatic cylinder 116 regulates movement of the robotic end effector 104. The robotic arm 102 then senses one or more coordinates of the predetermined location, for example, the robotic arm 102 may sense a slot 208 in a tray 206 to position the organic polarized object 202 in the slot 208 and proceeds towards the slot 208. The robotic arm 102 performs a vertical inversion to adjust the organic polarized object 202 from the first orientation 204 to the predetermined orientation 210. The predetermined orientation 210 may be determined by the robotic arm 102 based on a structure of the slot 208 of the tray 206. A first end, for example, a proximal end of the organic polarized object 202 may be oriented towards a narrow base of the slot 208 and a second end, for example, a distal end may be oriented towards a broad opening of the slot 208. The robotic arm 102 then positions the organic polarized object 202 in the slot 208 by releasing the organic polarized object 202 secured between the first elongated extension 122 and the second elongated extension 124 as exemplarily illustrated in FIG. 2C.

Figure 3A:
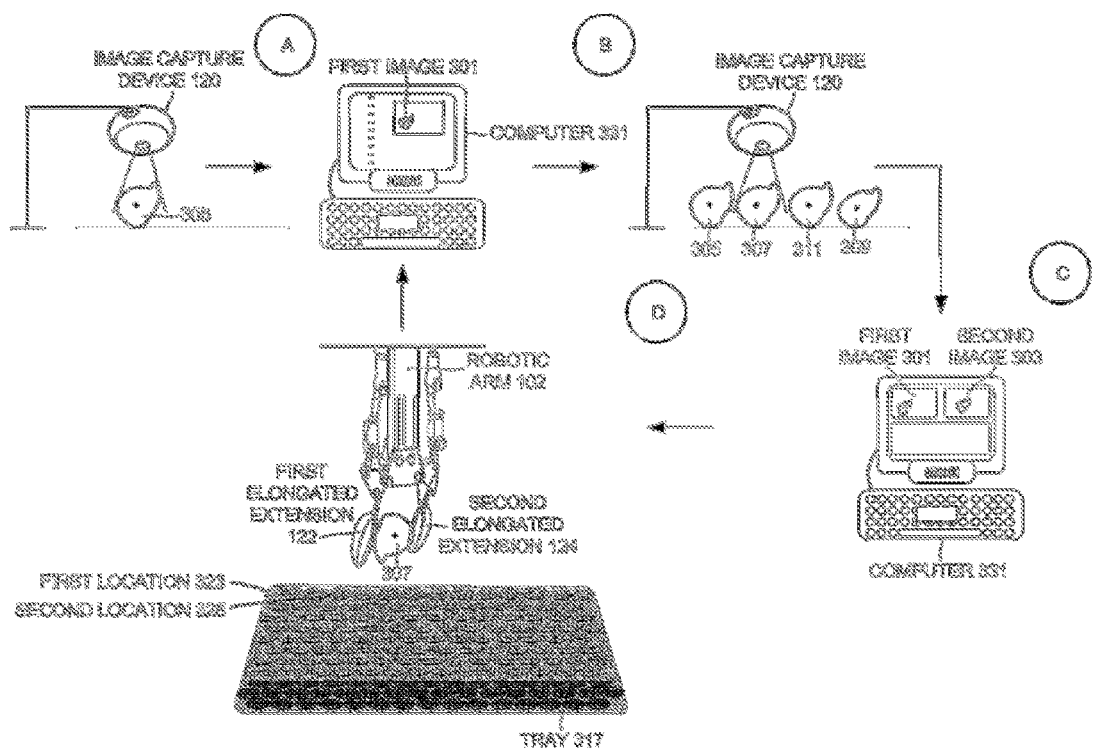
FIG. 3A is a diagrammatic process flow illustrating training, detection and selection of one or more organic polarized objects through a robotic arm, according to one or more embodiments.

FIG. 3A is a diagrammatic process flow illustrating training, detection and selection of one or more organic polarized object (e.g., a first organic polarized object 305, a second organic polarized object 307, a third organic polarized object 309 and a fourth organic polarized object 311), through a robotic arm 102 for positioning in one or more slots of a tray 317, according to one or more embodiments. In one embodiment, the organic polarized objects 305, 307, 309 and 311 may be detected using a cellular component such as Adenosine Tri-Phosphate (ATP), ATP being a content of the live organic polarized object. As illustrated in FIG. 3A, at step A, a first image 301 of the first organic polarized object 305 may be captured through an image capture device 120. The image capture device 120 includes, but is not limited to, digital cameras, a video camera, a probe, an optical device, an infra-red device, a biosensor, a color sensor, a heat sensor, a water sensor, and a laser device. The captured first image 301 may be processed via a data processing system (e.g. computer 331) to determine a first image data. A first dimension data of the first organic polarized object 305 may be algorithmically calculated using the first image data.

The first dimension data includes, but is not limited to, one or more of a width, a depth, a length, a distance, intensity, a curvature, a surface area, a volume, a narrow field, a broad field, edges, a center and an angle. A first data table of the first dimension data of the first organic polarized object 305 may be created. A training data set may be formed by transforming (e.g. rotation and scaling) the first data table of the first organic polarized object 305. The training data set may determine a desirable shape, of the organic polarized object to be selected from among the organic polarized objects for positioning in the tray 317. In one or more embodiments, the training data set may include information (e.g., coordinate information, dimension information) that can be used for training and executing certain functionalities through systems such as a robotic vision system. In an example embodiment, the training data set described herein may be used for generating commands or providing machine instructions for the robotic arm 102 to perform one or more tasks. Further, at step B, a second image 303 of the second organic polarized object 307 may be captured using the image capture device 120. A second image data of the second organic polarized object 307 may be collected using the captured second image 303 and a second dimension data may be computed based on the second image data through a processor coupled to the data processing system.

At step C, the training data set may be compared to the second dimension data through the processor to identify the shape, size, location and /or orientation of the second organic polarized object 307. If the first organic polarized object 305 and the second organic polarized object 307 have similar shape and size, the processor transmits a command to the robotic arm 102 to select the second organic polarized object 307 to be positioned in the tray 317. In one or more embodiments, at step D the robotic arm 102 secures the second organic polarized object 307 between a first elongated extension 122 and a second elongated extension 124 and positions at a first location 323 in the tray 317. Similarly, the third organic polarized object 311 may be selected owing to suitability of shape, size, and/or orientation and may be positioned at a second location 325 in the tray 317 by the robotic arm 102 as illustrated in FIG. 3A.

Figure 3B:
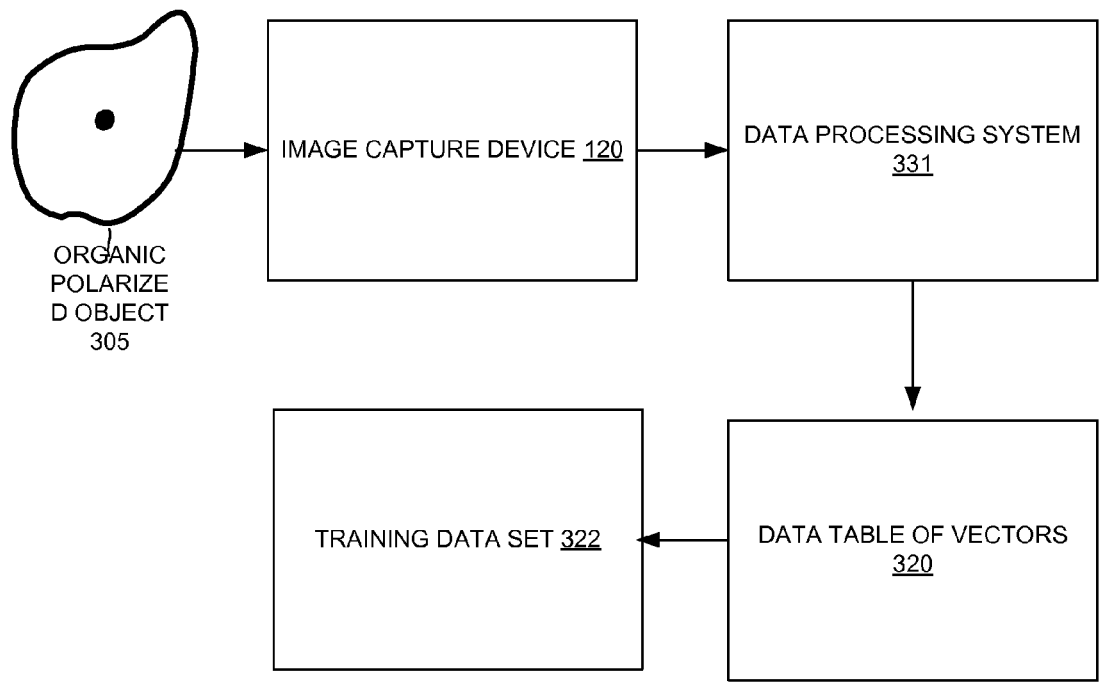
FIG. 3B is a schematic view illustrating generation of a training data set, according to one or more embodiments.

FIG. 3B is a schematic view illustrating generation of a training data set 322, according to one or more embodiments. As described above, in one or more embodiments, an image of the first organic polarized object 305 may be captured using the image capturing device 120 and communicated to the data processing system (e.g., computer 331). In one or more embodiments, a data table of vectors 320 may be generated based on the dimension data of the first organic polarized object 305 obtained from the captured image using suitable methods. In one or more embodiments, the generated data table of vectors 320 may be transformed, for example by rotating and scaling, to obtain the training data set 322. The training data set 322 may be composed of the transformed data table of vectors 320 associated with one or more organic polarized objects.

Figure 3C:
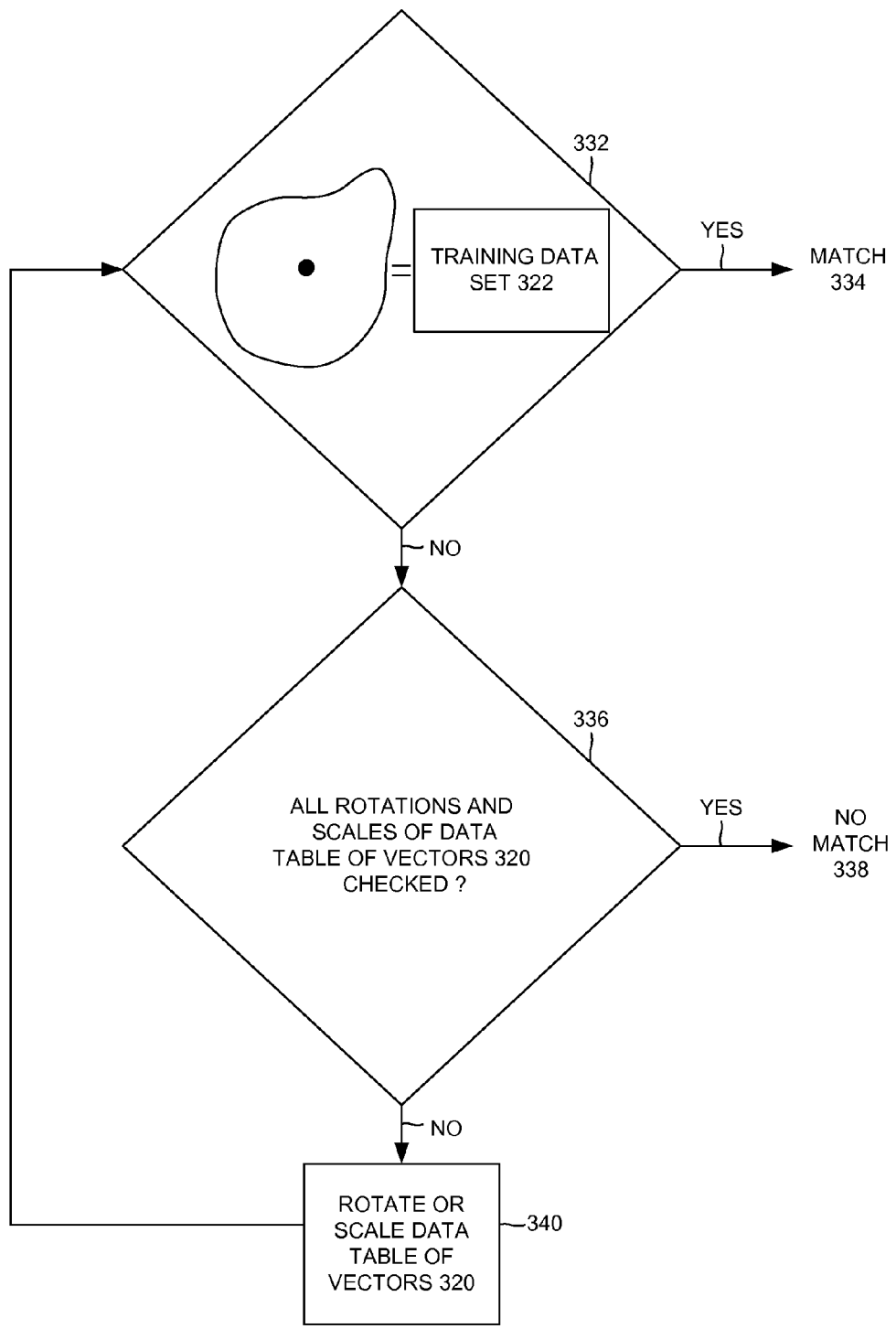
FIG. 3C is a flow chart illustrating a process of comparing data of the organic polarized object with the training data set through transforming a data table of vectors, according to one or more embodiments.

FIG. 3C is a flow chart illustrating a process of comparing data of the second organic polarized object 307 with the training data set 322 containing the necessary vector information on rotation and scaling of the data table of vectors 320 to identify if the second organic polarized object 307 possesses the desirable shape and size, as specified in the training data set 322, according to one or more embodiments. Aforementioned process may be repeated for other organic polarized objects of interest. The images of the organic polarized objects of interest may be captured through the image capture device 120 provided thereof. The images may be processed by the data processing system (e.g. computer 331). In one or more embodiments, in operation 332, the training data set 322 may be used for casting votes for determining a center of the second organic polarized object 307. The data table of vectors 320 may be rotated, scaled and voting process may be performed. The vote counts for each rotation and scaling may be compared to determine the orientation, size, shape, and location of the organic polarized objects. A particular orientation, size, shape and location for which the vote counts are highest may be selected. In one or more embodiments, if the highest vote count generated above is a specified threshold, then the organic polarized object is considered to be identified and is chosen for placement in operation 334.

Furthermore, if there is no substantial match in information between the second organic polarized object 307 and the information in the data table of vectors 320 of the first organic polarized object 305, then in operation 336, it may be determined whether all rotations and scaling of data table of vectors 320 is performed (e.g., by comparing vote count information obtained at each rotation and scaling of organic polarized object with the data table of vectors 320 of the first organic polarized object 305). Furthermore, if it is determined that all rotations and scales of the data table of vectors 320 are checked and there is no substantial match between the second organic polarized object 307 and the first organic polarized object 305, then in operation 338, the second organic polarized object 307 may be rejected. In one or more embodiments, in operation 340, rotation and scaling operation may be continued. Further, operation 332 may be initiated to determine a match and the process is continued until the organic polarized object 307 is matched with the first organic polarized object 305 or else the organic object 307 is rejected for not matching.

Figure 4:
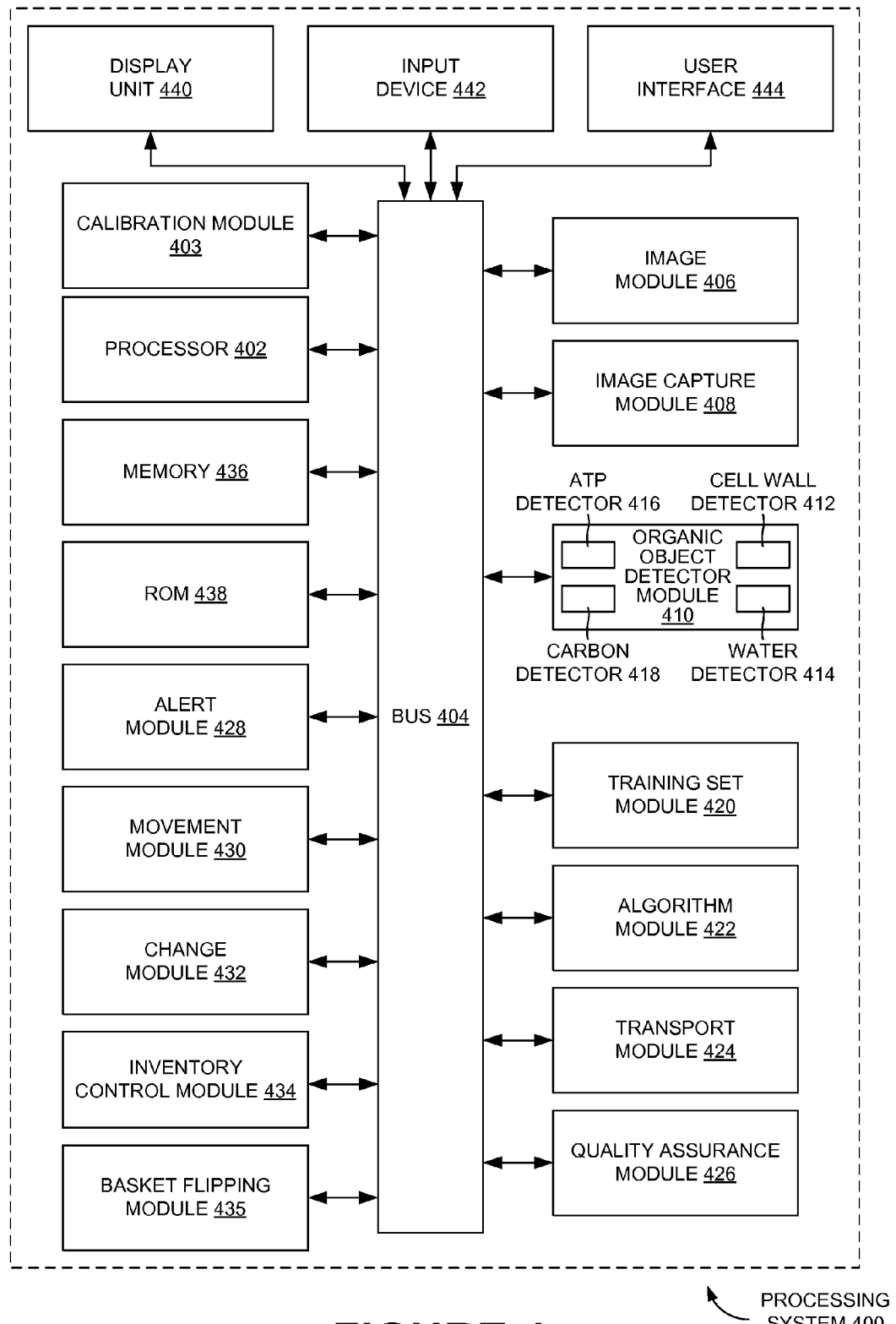
FIG. 4 is a block diagram of a processing system of organic polarized object detection and/or positioning, according to one or more embodiments.

FIG. 4 is a block diagram of a processing system 400 of organic polarized object detection and/ or positioning, in accordance with one or more embodiments. The processing system 400 includes a processor 402 operatively coupled with a bus 404. The processor 402 controls and processes various functionalities of the processing system 400. The processor 402 may include or may be operatively coupled to one or more of a calibration module 403, an image module 406, an image capture module 408, an organic object detector module 410, a training set module 420, an algorithm module 422, a transport module 424, a quality assurance module 426, an alert module 428, a movement module 430, a change module 432, an inventory control module 434, and a basket flipping module 435.

The calibration module 403 may align the coordinates systems of the robotic arm 102 with coordinate system of the image capture device 120. The image capture module 408 may configure an image capture device 120 to capture the images of the organic polarized objects periodically and communicate the images to the training set module 420. The captured image may be processed by the image module 406 based on an algorithm. In addition, the presence of any organic polarized object may be detected by an organic object detector module 410. In one or more embodiments, the organic object detector module 410 may include organic sensors such as cell wall detector 412, a water detector 414, ATP detector 416, and a carbon detector 418. Furthermore, the dimension data based on the image data of the captured image may be calculated using the algorithm module 422. The training data set may be generated using the dimension data of the organic polarized object by the training set module 420 using the algorithm module. In one or more embodiments, the organic object detector module 410 may coordinate with the image capture module 408. The images may be captured by the image capture module 408 as and when the organic polarized objects are detected by the organic object detector module 410.

Similarly, the dimension data of other organic polarized objects may be generated. Furthermore, the dimension data of the each of the other organic polarized objects may be compared with the training data set for choosing an object that is substantially similar to an ideal organic polarized object. Based on the result, the instructions may be generated for the robotic arm 102 to grasp the organic polarized object, for example, if the comparison evaluates to be true, and to reject the organic polarized object for example, if the comparison evaluates to be false. The result data may be communicated to the transport module 424 to generate instructions for the robotic arm 102 to perform a specific function.

The robotic 102 may be directed by the movement module 430 to perform a specific movement, for example, pick up and place the organic polarized object based on the dimension data of the organic polarized object. In addition, the robotic arm 102 may be configured by the movement module 430 to perform tasks with available degrees of freedom. In one or more embodiments, the robotic arm 102 motions may be designed to have 'n' degrees of freedom of movement. In one or more embodiments, the robotic arm 102 may be designed with degrees of freedom of movement that includes, but not limited to, a moving up and down in heaving, a moving left and right in swaying, a moving forward and backward in surging, a tilting forward and backward in pitching, a turning left and right in yawing, a full axis motion with 360 degree rotation, a tilting side to side in rolling, and a moving along one or more of x, y, and z coordinate axes. Furthermore, the selected object may be picked and placed into the tray 317. In one or more embodiments, the process may be continued until all the slots in the tray 317 are filled.

Furthermore, a request for the new tray may be communicated by the change module 432. In one or more embodiments, an alert may be communicated by the alert module 428 to indicate the processing system 400 that the tray 317 may be full. In one or more embodiments, the change module 432 may be triggered by the alert module 428. The alert module 428 may be controlled by the inventory control module 434. The quantity to be displaced, the speed of displacement, data processing, modification of algorithms, and the like may be controlled through the inventory control module 434. In one or more embodiments, the operator may be provided with an interface to configure the settings of the system through the inventory control module 434. Any odd organic polarized object for example, varying significantly in, but not limited to, color, shape, size condition or material, in the set of organic polarized objects may be rejected or separated through the quality assurance module 426. The determination of the odd organic polarized object in the set of organic polarized objects may be performed by the quality assurance module 426 based on, but not limited to, a size, color, shape, material, and the like using the detectors provided herein. The basket flipping module 435 may communicate with the transport module 424 to coordinate flipping the basket over. In one or more embodiments, the basket flipping module 630 may also be configured to control and/or coordinate removal of the tray after flipping the basket over.

Further, the processing system 400 also includes a memory 436 such as a random access memory (RAM) or other dynamic storage device, coupled to the bus 404 for storing information which can be used by the processor 402. The memory 436 can be used for storing any temporary information required, for example, the dimension data of the organic polarized object, a comparison data of the dimension data and the training data set. The processing system 400 further includes a read only memory (ROM) 438 or other static storage device coupled to the bus 404 for storing static information for the processor 402. The processing system 400 can be coupled via the bus 404 to a display unit 440, such as a cathode ray tube (CRT), a liquid crystal display (LCD) or a light emitting diode (LED) display, for rendering the display images to one or more users. An input device 442 including alphanumeric and other devices, may be coupled to the bus 404 for communicating an input to the processor 402. The input device 442 can be included in the processing system 400.

Another type of input device 442 may be a cursor control, such as a mouse, a trackball, or cursor direction keys for communicating the input to the processor 402 and for controlling cursor movement on the display unit 440. The input device 442 can also be included in the display unit 440, for example a touch screen. In some embodiments the processing system 400 may coupled via the bus 404 to a user interface 444. In one or more embodiments, the robotic arm 102 may also be trained for performing tasks associated with the organic polarized objects with respect to a particular organic polarized object. For example, the robotic arm 102 may be trained to recognize and plant tulips/tulip bulbs. The tulip bulbs may be recognized, properly oriented and then planted in a grid provided thereof. In one or more embodiments, the robotic arm 102 may be trained specifically through the user interface 444 provided. Furthermore, in one or more embodiments, the robotic arm 102 in the automated system may also be trained to simply pick up and place the objects. The embodiments described herein may be used for planting crops, for example, tulip bulbs, arranging the organic polarized objects for packing, and choosing the best organic polarized objects among the organic polarized objects.

Figure 5A:
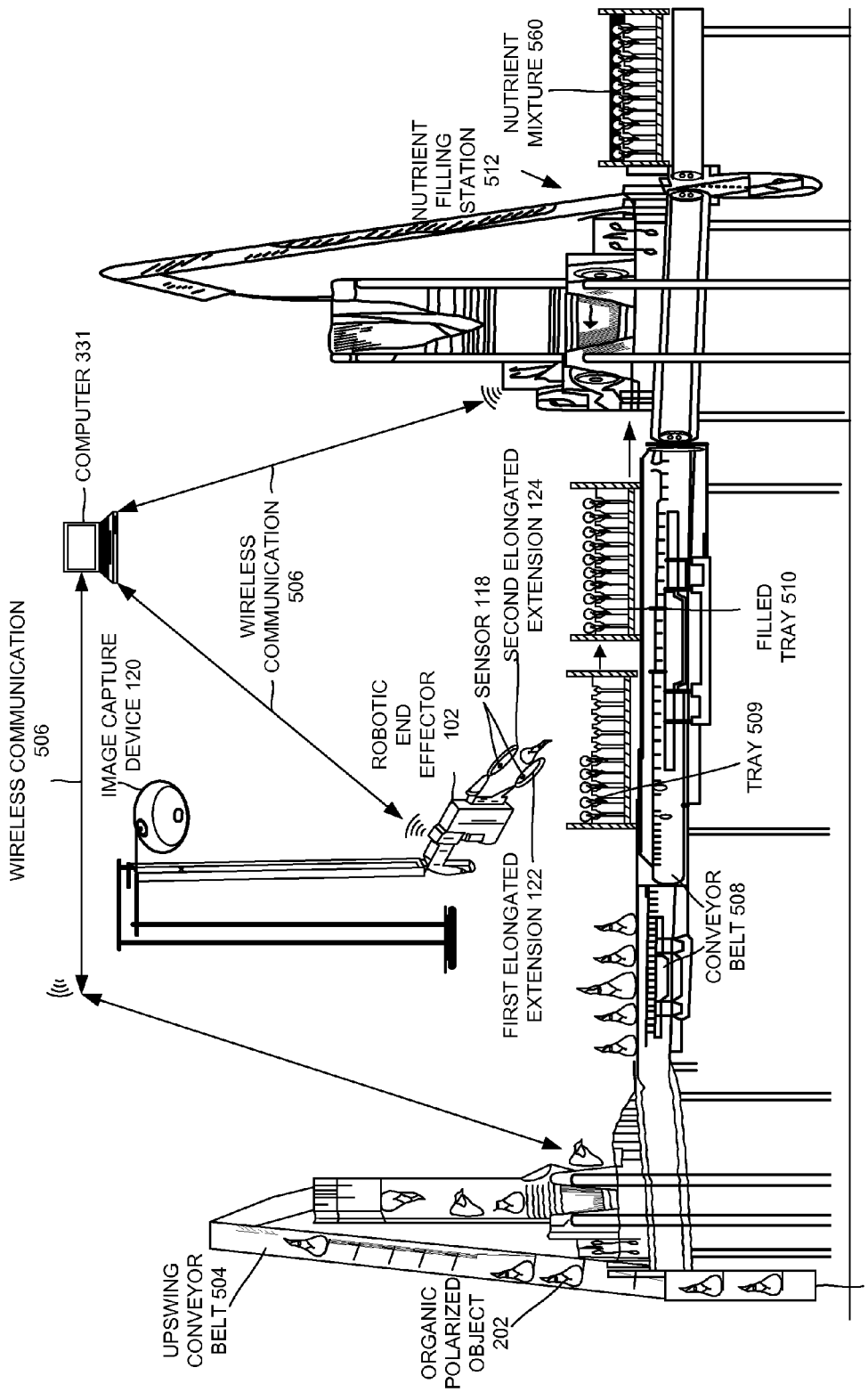

FIG. 5A-5B illustrate an automated organic polarized object organization system using a robotic arm 102 for an industrial application, in accordance with one or more embodiments.

One or more organic polarized objects, for example, an organic polarized object 202, may be transferred from organic polarized object storage 502 through an upswing conveyor belt 504. The arrival of each of the organic polarized objects may be sensed through a sensor and can be communicated to a data processing system (e.g., computer 331) through a wireless communication 506. The computer 331 counts the number of organic polarized objects arriving from the organic polarized object storage 502. In one or more embodiments the computer 331 updates a database based on the counting. In one or more embodiments the computer 331 communicates the number of the organic polarized objects to the robotic arm 102 through the wireless communication 506. The organic polarized objects are then transferred onto a conveyor belt 508 to expose the organic polarized objects to the image capture device 120 and/or the robotic arm 102.

One or more organic polarized objects may be sorted through the robotic arm 102 for organizing in one or more slots of a tray 509. The robotic arm 102 can be trained to automatically sort the organic polarized objects using a training data set. An image of the organic polarized object 202 may be captured using an image capture device 120 that may be coupled to the robotic arm 102. Example of the image capture device 120 includes, but is not limited to, a digital camera, a video camera, a probe, an optical device, an infra-red device, a biosensor, a color sensor, a heat sensor, a water sensor, and a laser device. In one or more embodiments the captured image may be transmitted to the data processing system for processing. In one or more embodiments the processing may be performed within the robotic arm 102. The captured image may be processed to obtain an image data. The image data may be processed through the computer 331 to obtain a dimension data.

The dimension data includes, but is not limited to, a width, a depth, a length, a distance, intensity, a curvature, a surface area, a volume, a narrow field, a broad field, a center, edges and an orientation. The dimension data may be compared with the training data set to identify a precise location, size, shape and/or orientation data of the organic polarized object 202. If the comparison yields a positive result indicating that the organic polarized object 202 matches one or more specifications including a specific shape, then the organic polarized object 202 may be picked up using the robot arm 102 using the precise location and/or orientation data. The organic polarized object 202 may be secured between a first elongated extension 122 and a second elongated extension 124 of the robotic arm 102 to grasp the organic polarized object 202.

After securing, the organic polarized object 202 may be vertically inverted and positioned in one of the slots in the tray 509 as illustrated in FIG. 5A. In one or more embodiments, a data regarding the tray 509 being filled, a number of available slots in the tray being filled, and/ or a number of trays filled may be sensed through the image capture device 120 and the data may be communicated through the wireless communication between the robotic arm 102 and the computer 331. The robotic arm 102 detects unfilled locations in the trays to be filled with the organic polarized objects based on the communication and/or using a sensor 118 to generate a filled tray 510. The filled tray 510 with the organic polarized objects may be transported to a nutrient filing station 512 through the conveyor belt 508. The organic polarized objects in the filled tray 510 may then be filled with a nutrient mixture 560 at the nutrient filling station 512. In one or more embodiments, the filled tray 510 may be covered with a basket 514 as illustrated in FIG. 5B, after filling the nutrient mixture 560. The basket 514 may then be flipped at a basket flipping station 516 through a basket flipping device 520 to contain the organic polarized objects. The filled tray 510 may now be on an upper side of the organic polarized objects and the basket 514 may be on a lower side of the organic polarized objects. The tray 510 may then be removed through the basket flipping device 520 or any other device so as to expose the organic polarized objects and leave organic polarized objects in the basket 514 as illustrated in FIG. 5B. The organic polarized objects may thus be oriented correctly for growing and covered with nutrient mixture 560.

Further, in one or more embodiments, the tray 509 may include one or more pins. The pins may be, for example, sharp pins. One end of the organic polarized objects may be oriented towards the pins and another end may be oriented away from the pins. In one or more embodiments, a hydroponic technology may be used to grow the organic polarized objects. As used herein the term hydroponics refers to a method of growing plants without soil. In these embodiments one or more essential nutrients may be introduced to the organic polarized objects through fluids (e.g., water) in the place of soil. The fluid (e.g. water) may provide the nutrients to the organic polarized objects.

Figure 6:
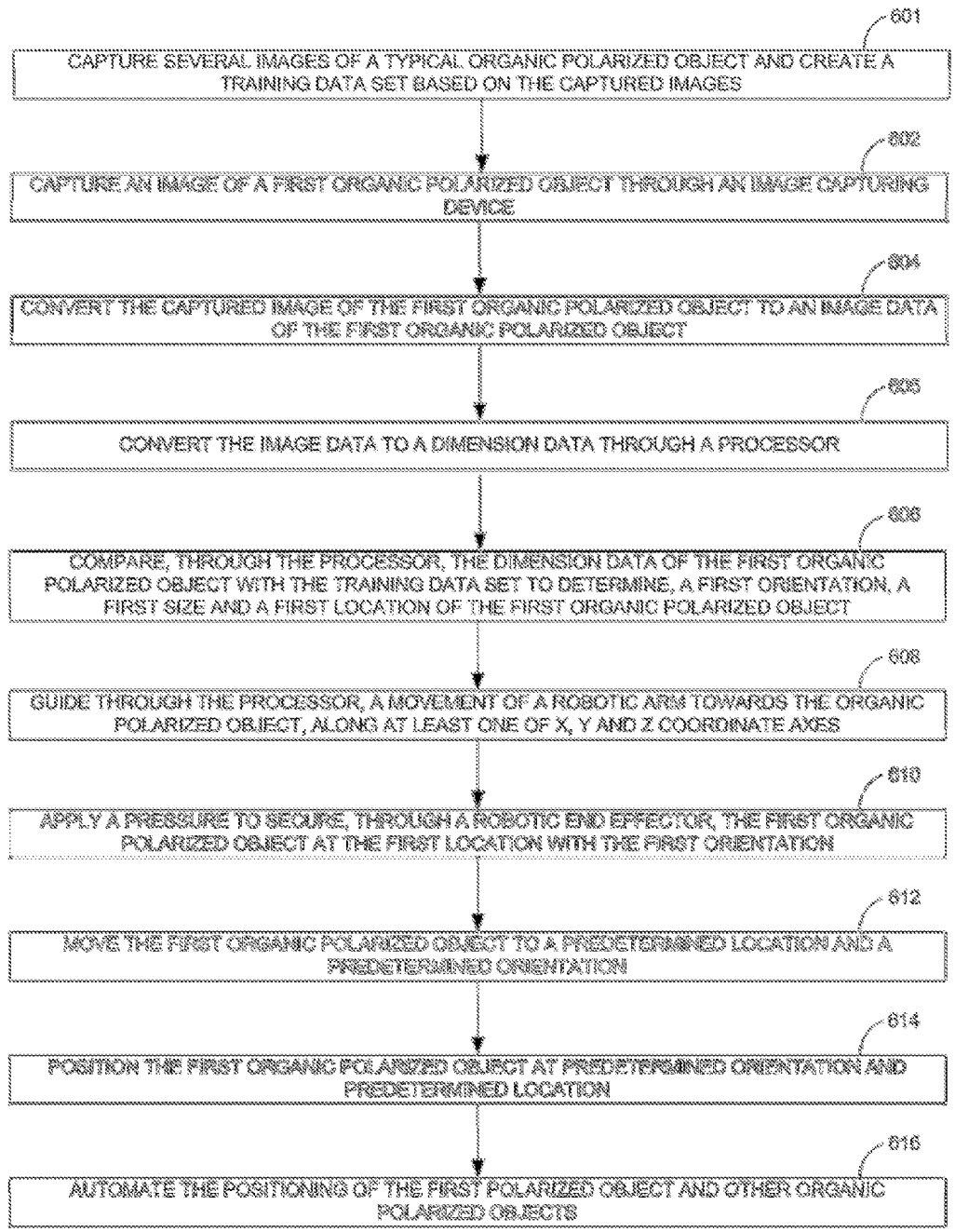
FIG. 6 is a process flow illustrating a method of positioning an organic polarized object at a predetermined location with a predetermined orientation, according to one or more embodiments.

FIG. 6 is a process flow diagram illustrating a method of positioning an organic polarized object at a predetermined location with a predetermined orientation, in accordance with one or more embodiments. As used herein, the term "organic polarized object" may refer to any organic polarized object of a regular or an irregular shape and form, having a proximal end and a distal end, and hence an orientation. Examples of the organic polarized object may include, but are not limited to, a seed, a plant bulb, a resting stage of a seed plant, and a sapling. The organic polarized object may be positioned through a robotic end effector.

In one or more embodiments, in operation 601, one or more images of a typical organic polarized object may be captured and a training data set may be created based on the captured images. In one or more embodiments, in operation 602, an image of a first organic polarized object may be captured through an image capture device. Examples of the image capture device include, but are not limited to, a digital camera, video camera, a probe, an optical device, infra-red device, a biosensor, a color sensor, a heat sensor, a water sensor and a laser device. In some embodiments, the image capture device may be operatively coupled with the robotic end effector. In some other embodiments, the image capture device may be embedded within the robotic end effector. In one or more embodiments, in operation 604, the captured image of the first organic polarized object may be converted to an image data of the first organic polarized object. In operation 605, the image data may be converted, through a processor, into a dimension data of the first organic polarized object. Examples of the dimension data may include, but are not limited to, one or more dimensions of the first organic polarized object, a structure of the first organic polarized object, mass and density of the first organic polarized object and a shape of the first organic polarized object, the center of the first organized polarized object and/or the edges of the first organic polarized object.

In one or more embodiments, in operation 606, a first location and a first orientation of the first organic polarized object may be determined through a processor, based on the dimension data of the first organic polarized object. In some embodiments, one or more feature extraction techniques, including, but not limited to a generalized Hough transform may be used to determine the first location, orientation, and size of the first organic polarized object based on a comparison of the training data set with the dimension data.

In one or more embodiments, in operation 608, a movement of the robotic end effector towards the first organic polarized object, along one or more of an x, a y, and a z coordinate axes, may be guided through the processor. The robotic arm may have "n" degrees of freedom of movement. The "n" degrees of freedom includes one or more of a moving up and down in heaving, a moving left and right in swaying, a moving forward and backward in surging, a tilting forward and backward in pitching, a turning left and right in yawing, a full axis motion in 360 degree rotation, a tilting side to side in rolling, and a moving along one or more of x, y, and z coordinate axes. The robotic end effector may move towards the determined first location and first orientation of the first organic polarized object and thus towards the first organic polarized object using the "n" degrees of freedom of movement based on the guidance. Further, a first pneumatic cylinder of the robotic end effector may regulate and control movement of a first elongated extension of the robotic end effector and/ or a second pneumatic cylinder of the robotic end effector may regulate and control movement of a second elongated extension of the robotic end effector.

In one or more embodiments, in operation 610, a pressure may be applied through a robotic end effector to secure the first organic polarized object at the first location with the first orientation. A required amount of pressure to be exerted on the first organic polarized object to secure the first organic polarized object without damaging may be computed through the processor. In some embodiments a stress withstanding capacity of the first organic polarized object may be computed through the processor, using the image data, to determine the required amount of pressure to be exerted on the first organic polarized object to secure without damaging, the first organic polarized object. In some embodiments, damage to the first organic polarized object may be reduced by adjusting the pressure exerted on the first organic polarized object when the first organic polarized object may be secured through the robotic end effector. In some embodiments, the pressure may be adjusted through one or more pneumatic cylinders including the first pneumatic cylinder and/or the second pneumatic cylinder. In some embodiments, one or more portions of the robotic end effector may be made of a flexible material to reduce the damage to the first organic polarized object.

In one or more embodiments, in operation 612, the first organic polarized object may be moved to a predetermined location and/or a predetermined orientation. The first orientation of the first organic polarized object may be adjusted to the predetermined orientation through the elongated extensions and/or the robotic end effector. The first organic polarized object may be secured between a first elongated extension and a second elongated extension of the robotic end effector to move the first organic polarized object. The movement of the first elongated extension and the second elongated extension may be regulated and synchronized through the pneumatic cylinders. The first pneumatic cylinder and the second pneumatic cylinder from among the pneumatic cylinders may regulate and synchronize the movement of the first elongated extension and the second elongated extension respectively.

In one or more embodiments, in operation 614, the first organic polarized object may be positioned at the predetermined location and a predetermined orientation. In one or more embodiments, in operation 616, the positioning of the first organic polarized object and/or other organic polarized objects at the predetermined location and predetermined orientation may be automated through a training data set. The predetermined location and the predetermined orientation may be automatically chosen or selected by a user. In some embodiments, the positioning of a second organic polarized object of a second size and at a second location may be automated through a comparison with the training data set. The second size may be different from a first size of the first organic polarized object and the second location may be different than the first location, and the second orientation may be different than the first orientation. In some embodiments, the robotic end effector may be programmed to position the organic polarized objects on a conveyor belt and the organic polarized objects may be transferred to the predetermined location through the conveyor belt.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense. The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

What is claimed is:

1. A method comprising:
   capturing an image of an organic polarized object through an image capture device;
   converting, through a processor, the captured image of the organic polarized object to an image data of the organic polarized object;
   converting, through the processor, the image data to a dimension data for the organic polarized object;
   determining, through the processor, a first location and a first orientation of the organic polarized object based on a comparison of the dimension data of the organic polarized object and a training data set;
   guiding through the processor, a movement of a robotic arm towards the organic polarized object, along at least one of x, y and z coordinate axes, wherein the robotic arm has "n" degrees of freedom of movement;
   applying a pressure through a robotic end effector to secure the organic polarized object at the first location with the first orientation;
   moving the secured organic polarized object to a predetermined location and a predetermined orientation, wherein the moving of the secured organic polarized object to the predetermined orientation includes vertically inverting the secured organic polarized object;
   positioning the secured organic polarized object of the predetermined orientation at the predetermined location; and
   automating, through a training data set, the positioning of the organic polarized object to the predetermined location and the predetermined orientation, wherein the predetermined location and the predetermined orientation may be at least one of automated and selected by a user.

2. The method of claim 1 further comprising:
   reducing the damage to the organic polarized object by adjusting, through a pneumatic cylinder, the pressure applied to the organic polarized object when the organic polarized object is secured through the robotic end effector.

3. The method of claim 2 further comprising:
   reducing the damage to the organic polarized object secured through the robotic end effector coupled to the robotic arm, wherein the robotic end effector comprises a flexible material to reduce the damage to the organic polarized object.

4. The method of claim 3 further comprising:
   selecting the robotic arm movement having "n" degrees of freedom of movement, wherein "n" degrees of freedom of movement is at least one of a moving up and down in heaving, a moving left and right in swaying, a moving forward and backward in surging, a tilting forward and backward in pitching, a turning left and right in yawing, a full axis motion in 360 degree rotation, a tilting side to side in rolling, and a moving along at least one of x, y, and z coordinate axes.

5. The method of claim 4 further comprising:
   selecting the predetermined location, wherein the predetermined location is at least one of a slot in a tray and a pin on which to affix the organic polarized object; and
   selecting the predetermined orientation based on at least one of:
   a structure of the slot of the tray, wherein a first end of the organic polarized object is oriented towards a narrow base of the slot and a second end of the organic polarized object is oriented towards a broad opening of the slot; and a pin on the tray, wherein a first end of the organic polarized object is oriented towards the sharp end of the pin and a second end of the organic polarized object is oriented away from the sharp end of the pin.

6. The method of claim 5 further comprising:

automating the positioning to the predetermined location and the predetermined orientation of a second organic polarized object with a second size, a second location and a second orientation, through a comparison of the dimension data of the organic polarized object with the training data set, wherein the second size is different than a first size of the organic polarized object, the second location is different than the first location, and the second orientation is different than the first orientation.

7. The method of claim 6 further comprising:

positioning the organic polarized object and the second organic polarized object from a conveyor belt to the predetermined location with the predetermined orientation.

* * * * *